United States Patent
Chaudhry et al.

(10) Patent No.: US 11,041,404 B2
(45) Date of Patent: Jun. 22, 2021

(54) IN-SITU WIRELESS MONITORING OF ENGINE BEARINGS

(71) Applicant: United Technologies Corporation, Farmington, CT (US)

(72) Inventors: Zaffir A. Chaudhry, South Glastonbury, CT (US); Goran Djuknic, New York, NY (US); Yan Chen, South Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/673,141

(22) Filed: Nov. 4, 2019

(65) Prior Publication Data

US 2021/0131308 A1 May 6, 2021

(51) Int. Cl.
| | |
|---|---|
| *F16C 19/52* | (2006.01) |
| *F16C 41/00* | (2006.01) |
| *F02C 3/04* | (2006.01) |
| *F01D 25/16* | (2006.01) |
| *F01M 13/04* | (2006.01) |

(Continued)

(52) U.S. Cl.
CPC .......... *F01D 25/164* (2013.01); *F16C 19/527* (2013.01); *F16C 41/00* (2013.01); *G01L 5/0019* (2013.01); *G01M 13/045* (2013.01); *F02C 3/04* (2013.01); *F05B 2240/50* (2013.01); *F05B 2260/407* (2013.01); *F05B 2260/96* (2013.01); *F16C 2202/36* (2013.01); *F16C 2233/00* (2013.01)

(58) Field of Classification Search
CPC .... F16C 19/527; F16C 41/00; F16C 2233/00; F16C 2202/36; F01D 25/164; F02C 3/04; G01M 13/035; G01M 13/045; G01L 5/0019; G01H 11/08; F05B 2240/50; F05B 2260/407; F05B 2260/96
USPC ............................ 384/448; 702/56; 340/683
See application file for complete search history.

(56) References Cited

U.S. PATENT DOCUMENTS

| | | | |
|---|---|---|---|
| 6,679,123 B2 * | 1/2004 | Lee .......................... | G01L 3/045 73/769 |
| 9,097,278 B2 | 8/2015 | Dahlman | |

(Continued)

FOREIGN PATENT DOCUMENTS

| | | | |
|---|---|---|---|
| AU | 2013251974 A1 * | 10/2014 | ............ F16C 19/522 |
| CN | 100404334 C  * | 7/2008 | .............. B60T 8/329 |

(Continued)

OTHER PUBLICATIONS

European Search Report for European Application No. 20205672.7 dated Mar. 22, 2021.

*Primary Examiner* — Marcus Charles
(74) *Attorney, Agent, or Firm* — Carlson, Gaskey & Olds, P.C.

(57) ABSTRACT

A bearing assembly monitoring system includes a bearing assembly supporting rotation of a rotating member. The bearing assembly includes a fixed portion and rotatable portion. A piezoelectric element is mounted to the fixed portion and generates an electric signal in response to a vibration of the fixed portion. A first transceiver is electrically coupled to the piezoelectric element to receive the electrical signal generated by the piezoelectric element and generate a signal indicative of the vibration of the fixed portion. A gas turbine engine bearing monitoring system and a method are also disclosed.

19 Claims, 3 Drawing Sheets

(51) Int. Cl.
*G01L 5/00* (2006.01)
*G01M 13/045* (2019.01)

(56) References Cited

U.S. PATENT DOCUMENTS

| | | | |
|---|---|---|---|
| 9,488,226 B2* | 11/2016 | Watanabe | F16C 33/6659 |
| 10,186,934 B2* | 1/2019 | Harakawa | H02K 11/33 |
| 2003/0030565 A1 | 2/2003 | Sakatani et al. | |
| 2003/0085812 A1 | 5/2003 | Froman et al. | |
| 2005/0259903 A1 | 11/2005 | Takizawa et al. | |
| 2014/0142872 A1 | 5/2014 | Hedin | |
| 2014/0341490 A1* | 11/2014 | Ito | F16C 41/004 |
| | | | 384/471 |
| 2014/0355644 A1 | 12/2014 | Gupta et al. | |
| 2015/0177100 A1* | 6/2015 | Dietz | F16C 19/52 |
| | | | 702/182 |
| 2016/0084734 A1 | 3/2016 | May et al. | |
| 2019/0078975 A1 | 3/2019 | Sibbach | |
| 2019/0178295 A1* | 6/2019 | Hebrard | C23C 14/34 |
| 2019/0277157 A1* | 9/2019 | Snow | F01D 25/16 |

FOREIGN PATENT DOCUMENTS

| | | | | |
|---|---|---|---|---|
| CN | 104884926 A | * | 9/2015 | F16C 19/00 |
| CN | 105627898 A | * | 6/2016 | B62D 55/14 |
| CN | 106471342 A | * | 3/2017 | F16C 41/008 |
| DE | 102012200777 A1 | * | 7/2013 | F03D 17/00 |
| DE | 102012220222 A1 | * | 5/2014 | F16C 19/527 |
| DE | 102013225330 A1 | * | 6/2015 | F16F 7/104 |
| DE | 102016202340 A1 | * | 1/2017 | G01H 11/08 |
| DE | 102018201168 A1 | * | 8/2018 | F16C 19/527 |
| EP | 3536901 A1 | | 9/2019 | |
| JP | 2008106910 A | * | 5/2008 | F16C 41/00 |
| JP | 2011169901 A | * | 9/2011 | G01L 3/12 |
| WO | WO-2006127870 A2 | * | 11/2006 | G01H 1/003 |
| WO | WO-2009092390 A1 | * | 7/2009 | F16C 19/522 |
| WO | WO-2013160061 A1 | * | 10/2013 | F16C 41/008 |
| WO | WO-2016064129 A1 | * | 4/2016 | G01R 31/12 |
| WO | WO-2016114418 A1 | * | 7/2016 | F16C 17/024 |

* cited by examiner

IN-SITU WIRELESS MONITORING OF ENGINE BEARINGS

BACKGROUND

A gas turbine engine typically includes a fan section, a compressor section, a combustor section and a turbine section. The compressor section is coupled to the turbine section by a shaft supported by several bearing assemblies. Bearing assemblies may be monitored to confirm desired operation. The location of bearing assemblies within an engine may complicate sensor monitoring and data acquisition.

Turbine engine manufacturers continue to seek further improvements to engine performance including improvements to data acquisition and engine monitoring systems.

SUMMARY

In a featured embodiment, a bearing assembly monitoring system includes a bearing assembly supporting rotation of a rotating member. The bearing assembly includes a fixed portion and rotatable portion. A piezoelectric element is mounted to the fixed portion and generates an electric signal in response to a vibration of the fixed portion. A first transceiver is electrically coupled to the piezoelectric element to receive the electrical signal generated by the piezoelectric element and generate a signal indicative of the vibration of the fixed portion.

In another embodiment according to the previous embodiment, the bearing assembly is disposed within a bearing compartment and the first transceiver is disposed within the bearing compartment.

In another embodiment according to any of the previous embodiments, the bearing compartment includes a wall with a communication opening. The first transceiver includes an internal antenna mounted to an inner surface of the wall at the communication opening and an external antenna is mounted to an outer surface of the wall at the communication opening.

In another embodiment according to any of the previous embodiments, a second transceiver is coupled to the external antenna and is disposed outside of the bearing compartment.

In another embodiment according to any of the previous embodiments, a controller receives signals from the second transceiver.

In another embodiment according to any of the previous embodiments, an electrical generator within the bearing compartment is electrically coupled to the first transceiver for powering the first transceiver.

In another embodiment according to any of the previous embodiments, the electric generator includes a rotor including permanent magnets attached to a rotating element within the bearing compartment and a stator disposed proximate the rotor.

In another embodiment according to any of the previous embodiments, the rotating element includes a shaft supported by the bearing assembly.

In another embodiment according to any of the previous embodiments, a conductor is coupled between the piezoelectric element and the first transceiver. The conductor is mounted to a surface within the bearing compartment with a dielectric material disposed between the conductor and a surface.

In another embodiment according to any of the previous embodiments, fixed portion of the bearing assembly includes an outer bearing race and the rotatable portion includes an inner bearing race and a plurality of bearing elements are disposed between the outer bearing race and the inner bearing race.

In another embodiment according to any of the previous embodiments, the fixed portion includes a mount disposed within the bearing assembly supporting an outer race of the bearing assembly.

In another featured embodiment, a gas turbine engine bearing monitoring system includes a rotatable shaft coupling a portion of a compressor section with a portion of a turbine section. A bearing assembly is disposed within a bearing compartment supporting rotation of the rotatable shaft. The bearing assembly includes a fixed portion and rotatable portion. A piezoelectric element is mounted to the fixed portion. The piezoelectric element generates an electric signal in response to a vibration of the fixed portion. A first transceiver is disposed within the bearing compartment and electrically coupled to the piezoelectric element to receive the electrical signal generated by the piezoelectric element and generate a signal indicative of the vibration of the fixed portion.

In another embodiment according to the previous embodiment, the bearing compartment includes a wall with a communication opening and the first transceiver includes an internal antenna mounted to an inner surface of the wall at the communication opening and an external antenna is mounted to an outer surface of the wall at the communication opening.

In another embodiment according to any of the previous embodiments, a second transceiver is coupled to the external antenna and disposed outside of the bearing compartment. The second transceiver is in communication with an engine controller.

In another embodiment according to any of the previous embodiments, an electrical generator within the bearing compartment electrically is coupled to the first transceiver for powering the first transceiver.

In another embodiment according to any of the previous embodiments, the electric generator includes a rotor including permanent magnets attached to rotatable shaft within the bearing compartment and a stator disposed proximate the rotor.

In another featured embodiment, a method of monitoring a bearing assembly includes generating an electric signal indicative of vibration of a bearing element with a piezoelectric element mounted to fixed support within a bearing compartment. The electric signal is communicated to a first transceiver disposed within the bearing compartment and generating a first signal indicative of a sensed vibration of the bearing element. The first signal is communicated to a second transceiver disposed outside the bearing compartment. A bearing fault condition with a controller is determined based on the communicated first signal.

In another embodiment according to the previous embodiment, electric power is generated with a generator disposed within the bearing compartment and powering the first transceiver with the generated electric power.

In another embodiment according to the previous embodiment, the first signal is communicated from the first transceiver to the second transceiver through a wireless link between an internal antenna disposed within the bearing compartment proximate a communication opening and an external antenna disposed outside the bearing compartment proximate the communication opening.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
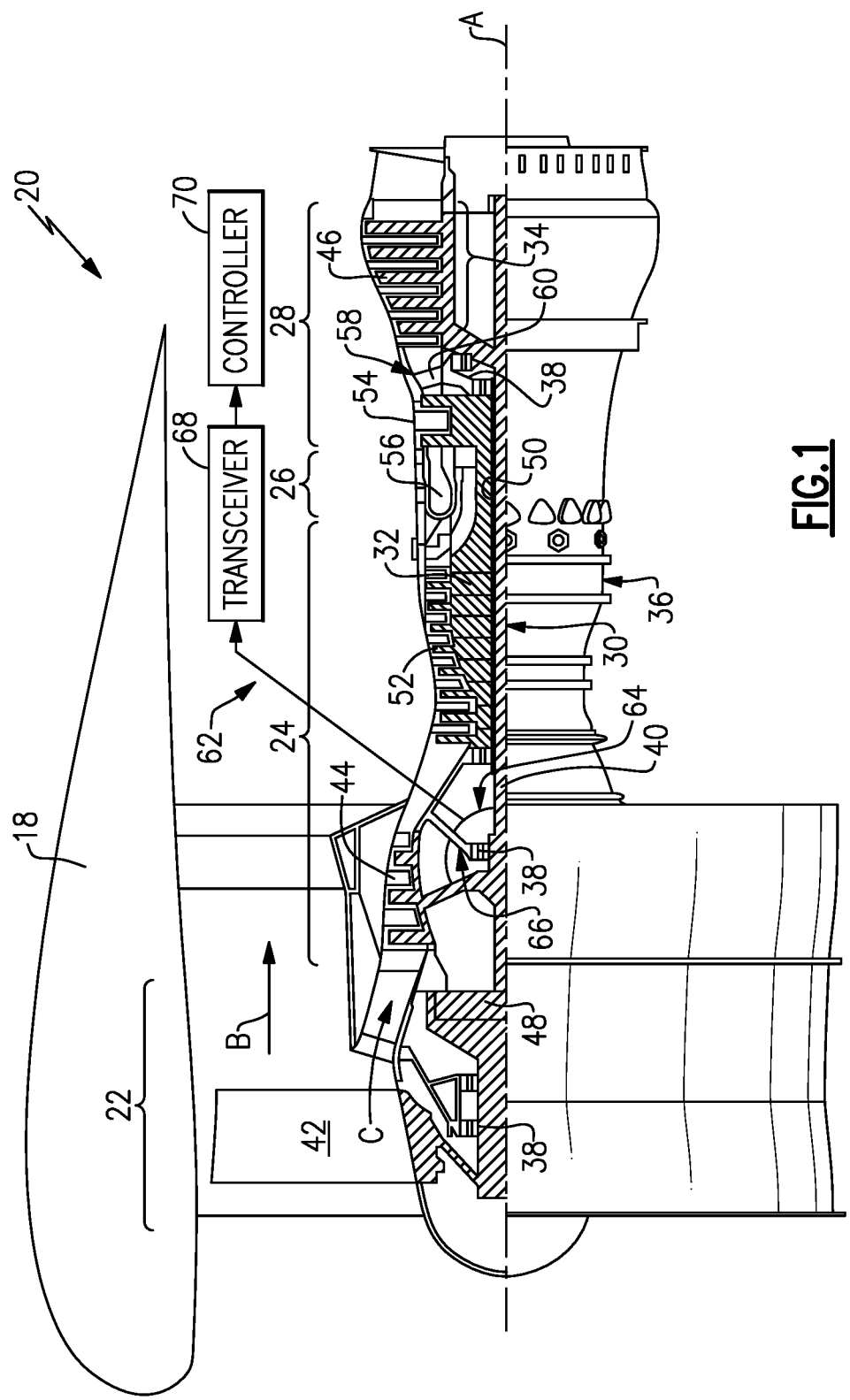
FIG. 1 is a schematic view of an example turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 18, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing assemblies 38. It should be understood that the various bearing assemblies 38 may alternatively or additionally be provided at different locations and the location of bearing assemblies 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan section 22 through a speed change mechanism, which in exemplary gas turbine engine 20 is illustrated as a geared architecture 48 to drive fan blades 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing assemblies 38 disposed about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor 44 and the fan blades 42 may be positioned forward or aft of the location of the geared architecture 48 or even aft of turbine section 28.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \ °R)/(518.7° R)]^{0.5}$. The "Low corrected fan tip speed" as disclosed herein according to one non-limiting embodiment is less than about 1150 ft/second (350.5 meters/second).

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotors schematically indicated at 34. In another non-limiting example embodiment, the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The example engine 20 includes a bearing assembly monitoring system 62 that generates information indicative of bearing health. Each of the bearing assemblies 38 are disposed within bearing compartment 64 to and contain lubricant provided to the bearings. A single bearing compartment 64 is shown by way of example, however, each of the bearing assemblies 38 are disposed within corresponding bearing compartment. A sensor is provided on a fixed structure proximate the bearing assembly 38 for detecting vibrations. The sensor is a piezoelectric element 66 that is mounted to a fixed portion of the bearing assembly 38. The piezoelectric element 66 generates an electric signal in response to mechanical stress. Mechanical stress can included tension, compression and/or strain. The piezoelectric element 66 generates an electric signal proportionate to the applied mechanical stress. The electric signal is communicated to a transceiver 68 and communicated to a controller 70. The controller 70 can be an overall aircraft controller or other controller such as a Full Authority Digital Engine Control (FADEC). The information provided to the controller 70 is analyzed to provide an indication of the health of each bearing assembly 38. Information regarding bearing health can be used in real time and/or to indicate when a maintenance activity is warranted.

Figure 2:
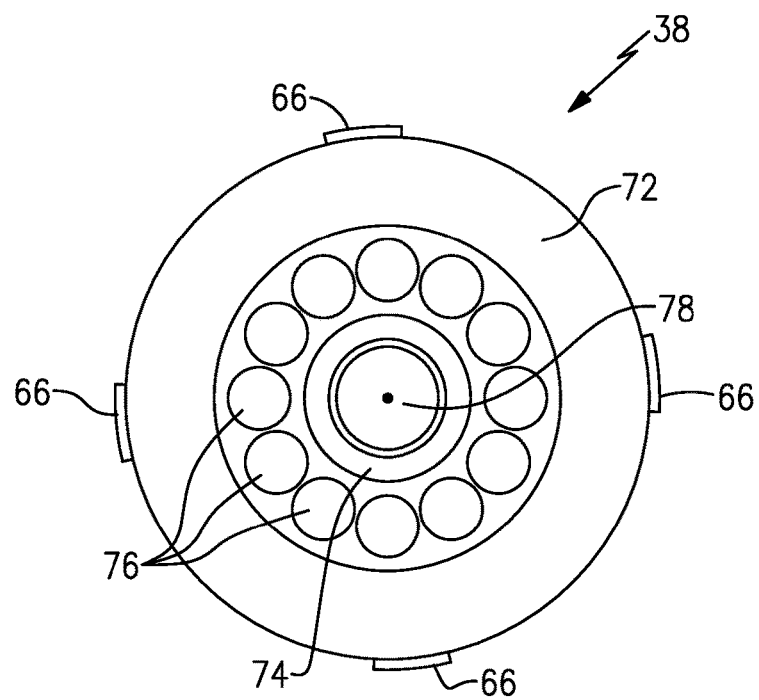
FIG. 2 is a schematic view of an example bearing assembly embodiment.

Referring to FIG. 2 with continued reference to FIG. 1, an example bearing assembly 38 is schematically shown. The bearing assembly 38 includes a plurality of bearing elements 76 disposed between a fixed outer bearing race 72 and a rotating inner bearing race 74. A shaft 78 is supported within the inner bearing race 74. Piezoelectric elements 66 are attached at circumferentially spaced locations about the outer bearing race 72. The multiple piezoelectric elements 66 are disposed within a common axial plane in one example embodiment. Additionally, the spaced apart piezoelectric elements 66 enable a determination of uneven loads, misalignment and other asymmetric loading. Different loading conditions at different circumferential locations about the fixed outer bearing race 72 result in the generation of different electrical signals by each of the piezoelectric elements 66. The differences in electrical signals between the multiple piezoelectric elements 66 may be utilized to provide information indicative of misalignment and uneven loading. It should be appreciated that although multiple piezoelectric elements 66 are shown by way of example, a single piezoelectric element 66 as well a different number of elements 66 may also be utilized and are within the contemplation and scope of this disclosure.

Figure 3:
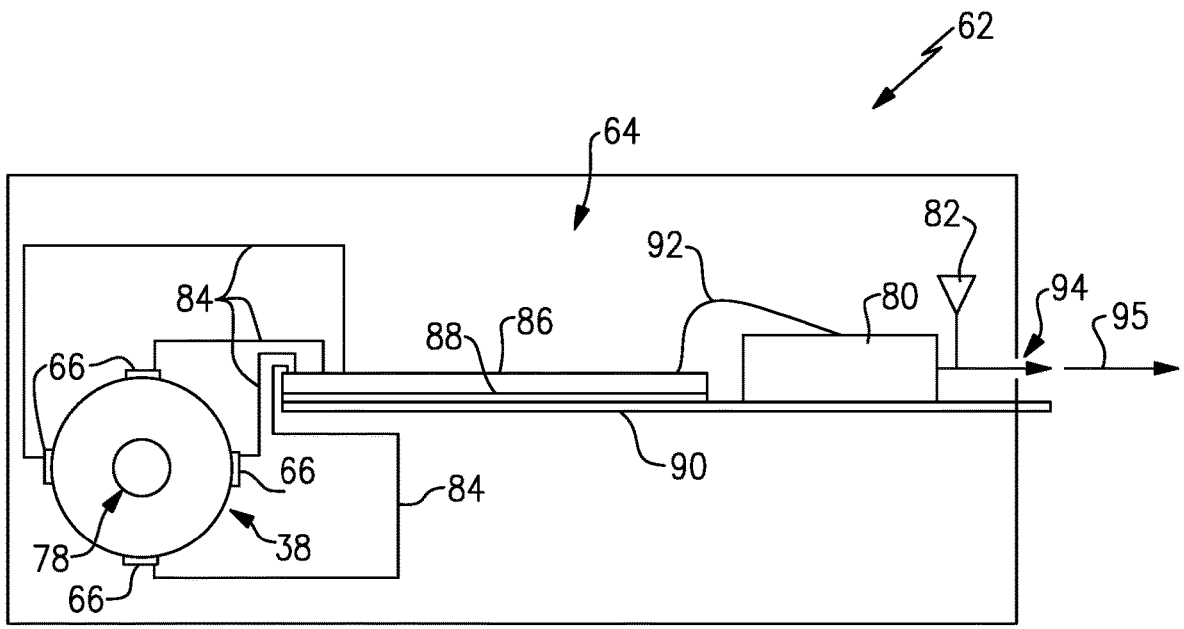
FIG. 3 is a schematic view of an example bearing assembly monitoring system.

Referring to FIG. 3 with continued reference to FIG. 2, the example bearing monitoring system 62 is schematically shown. The system 62 is disposed within the bearing compartment 64 and includes the piezoelectric elements 66 supported about the fixed bearing outer race 72. Each of the elements 66 are attached by a first conductor 84 to a fixed conductor 86. The fixed conductor 86 is mounted to a surface 90 within the bearing compartment 64. The bearing compartment 64 is formed from a metal material and therefore any mounting to the metal material must consider electrical conductivity of the metal surfaces. In this disclosed example, the fixed conductor 86 is attached to the surface 90 through a dielectric material 88. The dielectric material 88 provides insulation against conduction of the electrical signal into the surface 90.

The example fixed conductor 86 may be strip of electrically conductive material that is applied to the surface 90. The fixed conductor 86 is schematically shown as a flat strip of material and may be provided to follow contours within the bearing compartment 64 to eliminate multiple individual wires extending between the elements 66 and a first transceiver 80. The fixed conductor 86 is provided within the compartment 64 in locations within the bearing compartment 64 to prevent obstruction of other bearing support elements.

Alternatively, the conductor 86 can be a single conductive strip, in which case the other lead from the piezoelectric element 66 would be connected to the engine metal body that will serve as a signal ground. Transceiver 80 will then also be grounded to the engine metal body and enable single-ended signaling.

Another alternative within the scope and contemplation of this disclosure enables differential signaling, where the conductor 86 is provided as two conductors 86 that are each connected to one of the first conductors 84 corresponding to each of the piezoelectric elements 66. Each of the elements 66 are linked to the transceiver 80 through a separate connection including a separate conductor 86. The separate conductor 86 may be a single-lead or differential connection. Accordingly, signals from different sensors are not combined into a single conductor to provide multiple separate and different signals that enable a better analysis. Additionally, the transceiver 80 will have separate channels that correspond with each of the separate elements 66 to provide for separate transmission of information. The use of multiple conductors 86 enables differential signaling, in which case the transceiver 80 would be connected by second conductors 92 and eliminate the need for grounding it. Differential signaling provides higher noise immunity because common-mode signals (like noise or interference) are either completely rejected or greatly diminished.

In this disclosed embodiment, a second conductor 92 communicates the electric signals from the elements 66 to the first transceiver 80. The first transceiver 80 is disposed within the bearing compartment 64. The first transceiver 80 processes the electric signal from the elements 66 and generates an output signal 95 that is indicative of the vibratory response generated by the elements 66. The output signal 95 maybe transmitted through a hard wired communication link as indicated at 94 and/or as a wireless signal by an inner antenna 82.

Figure 4:
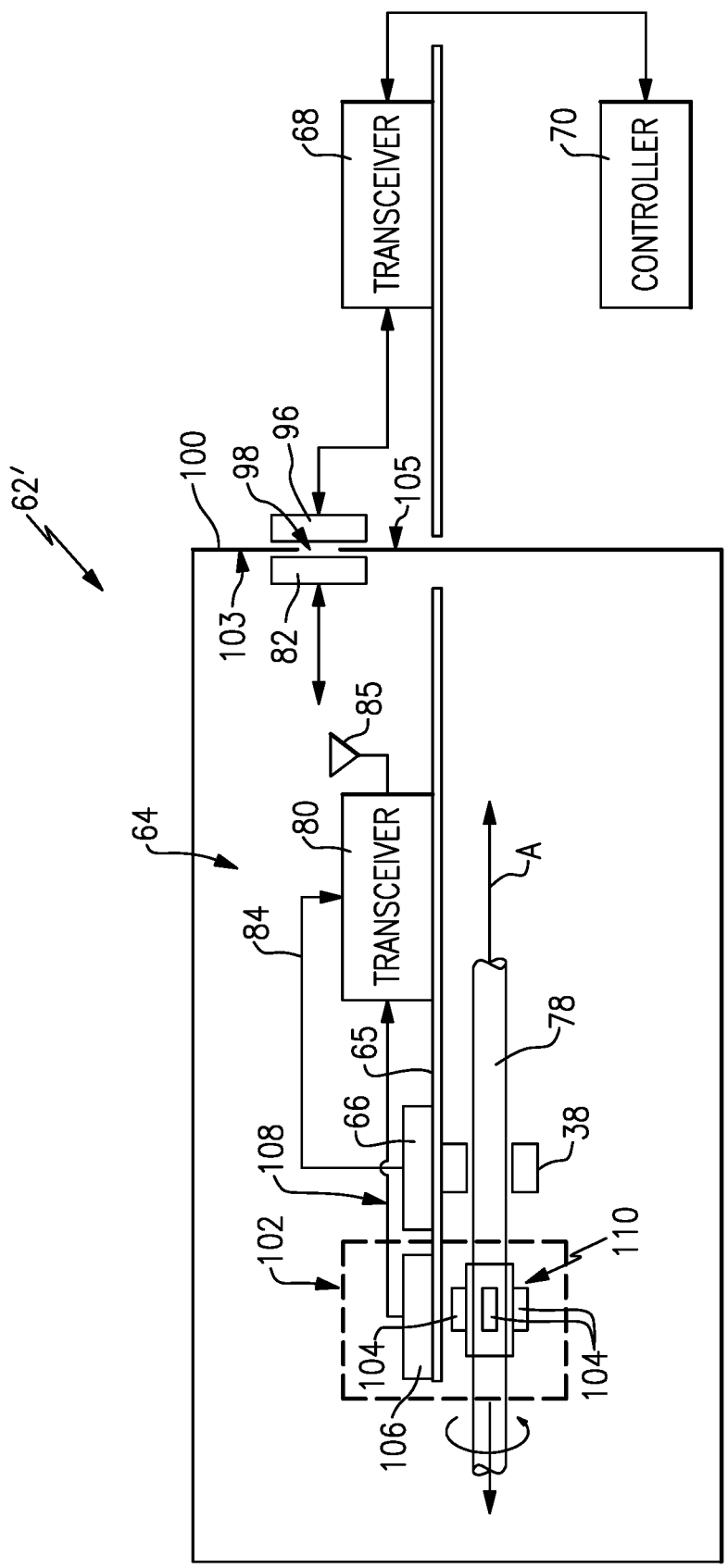
FIG. 4 is a schematic view of another example bearing assembly monitoring system embodiment.

Referring to FIG. 4, another example bearing monitoring system embodiment is schematically shown and indicated at 62'. The first transceiver 80 is provided electric power 108 by a generator 102 disposed within the bearing compartment 64. In this example embodiment, the shaft 78 includes a portion 110 disposed within bearing compartment 64 that includes permanent magnets 104. The permanent magnets 104 rotate relative to a fixed coils/rectifier 106 to generate electric power as is known. The shaft 78 may be a portion of the outer shaft 50 or the inner shaft 40 depending on the location of the bearing assembly 38 within the engine 20. It is also within the contemplation of this disclosure that the shaft 78 is a part of another shaft of the engine that rotates within a bearing compartment 64. Power generated by the generator 102 power the first transceiver 80 to eliminate the need to communicate power form a location external to the bearing compartment 64. Although a specific configuration of a generator is disclosed by way of example, other generator configurations could also be utilized and are within the scope and contemplation of this disclosure.

In this example embodiment, the elements 66 are attached to a support structure that is shown schematically at 65 that supports the bearing assembly 38. Accordingly, in this example embodiment, the elements 66 are not mounted directly to the outer bearing race of the bearing assembly 38 as shown in the example embodiment shown in FIG. 3. Instead, the elements 66 are mounted to the fixed support structure 65 that supports the outer race and thereby the bearing assembly 38. It should be appreciated, that the elements 66 may also be mounted directly to the outer race of the bearing assembly 38.

The bearing compartment 64 is an internal cavity defined within metal structures and walls and therefore may not enable transmission of a consistent wireless signal from the first transceiver 80. In this example, a metal wall 100 includes a communication opening 98 and the first transceiver 80 includes an antenna 85. Transmissions within the bearing compartment are wireless such that a signal from the antenna 85 of the transceiver 80 is wirelessly transmitted to the internal antenna 82.

The communication opening 98 extends entirely through the wall 100. The internal antenna 82 is mounted to an inner surface 103 of the wall 100 over the opening 98. An external antenna 96 is mounted to an outer surface 105 of the wall over the opening 98 and is in communication with a second transceiver 68. The internal antenna 82 receives a wireless signal from the transceiver 80 transmits a wireless signal through the opening 98 to the external antenna 96. The internal antenna 82 and the external antenna 96 therefore provide for the transmission of a reliable wireless signal. The second transceiver 68 is in communication with the controller 70. The communication link between the second transceiver 68 and the controller 70 may be a wired link or a wireless link.

In operation, a mechanical stress generated by an unbalanced load or fault in the bearing assembly 38 induces the generation of an electric signal 84 by the piezoelectric elements 66. The electric signal 84 from the piezoelectric elements 66 is communicated to the first transceiver 80. The first transceiver 80 is powered by the generator 102 and generates a signal for transmission to the second transceiver 68 disposed outside the bearing compartment 64. The signal from the first transceiver 80 is sent through a wireless link between the inner antenna 82 and the outer antenna 96 through the communication opening 98. The second transceiver 68 communicates this signal to the controller 70. The controller 70 uses the information to determine a bearing fault condition and if corrective action is warranted.

The disclosed bearing monitoring systems provide for the location of sensors closer to the bearing assemblies to provide increased signal robustness and reliability.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A bearing assembly monitoring system comprising:
a bearing assembly supporting rotation of a rotating member, the bearing assembly including a fixed portion and a rotatable portion;
a piezoelectric element mounted to the fixed portion, the piezoelectric element generating an electric signal in response to a vibration of the fixed portion; and
a first transceiver electrically coupled to the piezoelectric element to receive the electrical signal generated by the piezoelectric element and generate Hall an output signal indicative of the vibration of the fixed portion.

2. The bearing assembly monitoring system as recited in claim 1, wherein the bearing assembly is disposed within a bearing compartment and the first transceiver is disposed within the bearing compartment.

3. The bearing assembly monitoring system as recited in claim 2, wherein the bearing compartment includes a wall with a communication opening and the first transceiver includes an internal antenna mounted to an inner surface of the wall at the communication opening and an external antenna is mounted to an outer surface of the wall at the communication opening.

4. The bearing assembly monitoring system as recited in claim 3, including a second transceiver coupled to the external antenna and is disposed outside of the bearing compartment.

5. The bearing assembly monitoring system as recited in claim 4, including a controller receiving signals from the second transceiver.

6. The bearing assembly monitoring system as recited in claim 2, including an electrical generator within the bearing compartment electrically coupled to the first transceiver for powering the first transceiver.

7. The bearing assembly monitoring system as recited in claim 6, wherein the electric generator includes a rotor including permanent magnets attached to a rotating element within the bearing compartment and a stator disposed proximate the rotor.

8. The bearing assembly monitoring system as recited in claim 6, where the rotating element comprises a shaft supported by the bearing assembly.

9. The bearing assembly monitoring system as recited in claim 1, including a surface in the bearing compartment and a conductor coupled between the piezoelectric element and the first transceiver, the conductor mounted to the surface within the bearing compartment with a dielectric material disposed between the conductor and a surface.

10. The bearing assembly monitoring system as recited in claim 1, wherein the fixed portion of the bearing assembly comprises an outer bearing race and the rotatable portion comprises an inner bearing race and a plurality of bearing elements are disposed between the outer bearing race and the inner bearing race.

11. The bearing assembly monitoring system as recited in claim 1, wherein the fixed portion supports an outer race of the bearing assembly.

12. A gas turbine engine bearing monitoring system comprising:
a rotatable shaft coupling a portion of a compressor section with a portion of a turbine section;
a bearing assembly disposed within a bearing compartment supporting rotation of the rotatable shaft, the bearing assembly including a fixed portion and a rotatable portion;
a piezoelectric element mounted to the fixed portion, the piezoelectric element generating an electric signal in response to a vibration of the fixed portion; and
a first transceiver disposed within the bearing compartment and electrically coupled to the piezoelectric element to receive the electrical signal generated by the piezoelectric element and generate an output signal indicative of the vibration of the fixed portion.

13. The gas turbine engine bearing monitoring system as recited in claim 12, wherein the bearing compartment includes a wall with a communication opening and the first transceiver includes an internal antenna mounted to an inner surface of the wall at the communication opening and an external antenna is mounted to an outer surface of the wall at the communication opening.

14. The gas turbine engine bearing monitoring system as recited in claim 13, including a second transceiver coupled to the external antenna and disposed outside of the bearing compartment, the second transceiver in communication with an engine controller.

15. The gas turbine engine bearing monitoring system as recited in claim 12, including an electrical generator within the bearing compartment electrically coupled to the first transceiver for powering the first transceiver.

16. The gas turbine engine bearing monitoring system as recited in claim 15, wherein the electric generator includes a rotor including permanent magnets attached to the rotatable shaft within the bearing compartment and a stator disposed proximate the rotor.

17. A method of monitoring a bearing assembly, the method comprising: generating an electric signal indicative of vibration of a bearing element with a piezoelectric element mounted to a fixed support within a bearing compartment;

communicating the electric signal to a first transceiver disposed within the bearing compartment and generating a first output signal indicative of a sensed vibration of the bearing element;

communicating the first output signal to a second transceiver disposed outside the bearing compartment; and determining a bearing fault condition with a controller based on the communicated first output signal.

18. The method as recited in claim 17, including generating electric power with a generator disposed within the bearing compartment and powering the first transceiver with the generated electric power.

19. The method as recited in claim 17, wherein the communicating the first signal from the first transceiver to the second transceiver further comprises communicating through a wireless link between an internal antenna disposed within the bearing compartment proximate a communication opening and an external antenna disposed outside the bearing compartment proximate the communication opening.

* * * * *